April 2, 1968

L. BACHER 3,376,051

TRAILER HITCH

Filed Feb. 10, 1966

INVENTOR.
LUDWIG BACHER
BY
ATTORNEYS

United States Patent Office 3,376,051
Patented Apr. 2, 1968

3,376,051
TRAILER HITCH
Ludwig Bacher, 3496 Rankin Ave.,
Windsor, Ontario, Canada
Filed Feb. 10, 1966, Ser. No. 526,523
Claims priority, application Germany, Feb. 13, 1965,
B 80,525
1 Claim. (Cl. 280—512)

ABSTRACT OF THE DISCLOSURE

The invention relates to a trailer hitch for coupling a trailer to a ball member carried by a towing vehicle. The hitch comprises a fixed ball-shell part and a pivoted ball-shell part for gripping the ball member. An elongated lever has one end fixed to the pivoted ball-shell part for moving the latter between ball-gripping and ball-releasing positions. A latch structure is provided for locking the lever down to hold the pivoted ball-shell part in ball-gripping position. The lever is flexibly resilient, and when locked down is flexed from its free state condition and held in tension. The latch structure comprises a pair of substantially identical latch members disposed in generally upright laterally spaced relation on opposite sides of the plane of swinging movement of the lever, having aligned downwardly opening recesses for receiving aligned pins extending outwardly from opposite sides of the lever to lock the lever down.

---

The invention is in a trailer hitch divided into two main interlocked parts, one of which is mounted at the rear in the center of the drawing vehicle, with a ball-head pointing upwards. The other part, or ball-shell, is mounted rigidly on the trailer shaft, pointing toward the draft vehicle. This ball-shell is transversely divided and unhitchable by means of a hinge and lever.

With known trailer hitches, the outer locking mechanism is developed in such a way that the lever in its use position, i.e., in position of "lock," is kept rigid. A U-shaped interlocking part (U-bolt) is swung over a lever in such a way that the interlocking parts are at the upper side of the lever. A spring bolt then drops into locking position of U-bolt and groove of the lever and is thereby interlocked. To avoid self-unlocking of this rigid arrangement, only very limited play is allowable between the "U-bolt" and lever. With this kind of trailer hitch, it is, however, unavoidable that the interlocking parts are subject to deformation and therefore severely rub against one another. Even though such deformed parts will still serve their purpose, it will be with difficulty that they can be locked or unlocked and would, therefore, need readjustments and refitting. Experience, however, has shown that repairs of this kind are seldom undertaken and, consequently, a lot of force is needed to overcome the troublesome locking and/or unlocking of said hitch, and to make it safe when in use in traffic on roads.

The basic aim of this invention is to create a trailer hitch that would be simple and easy to operate and which even after extensive usage could be locked and/or unlocked safely with no difficulty. In accordance with the invention of this trailer hitch of the kind as explained at the outset, this is achieved in that the lever, which has the clamp-like ball-surrounding-shell part incorporated in it, is movable in one direction toward locked position, with locked hitch, and is further movable in the same direction against a spring action. Movement of the lever to open the hitch is hindered by means of a locating fixture (double hook).

Through the provision of a lever with spring action which is further movable over its locating fixture (or locked position) it is possible to always lock it securely. Deformation of the interlocking parts is for the proper and secure working of the trailer hitch in its locked position infinitesimal. Therefore, the production tolerances need not be so exact and accordingly production of the kind of trailer hitch as invented is simplified and less expensive.

As a preferable way to fabricate the trailer hitch in accordance with the invention, the lever ought to be made of spring material. The locating fixture (double hook) could also be, for instance, carried out in the form of a side hook, whereby the spring lever would have to be pressed down and sideways in order to interlock it. The fabrication of such a trailer hitch would further be simplified and less expensive as besides the ball-surrounding shell part, there are no other movable parts. It is imperative, however, in this case that the spring lever would "give" (be bendable) downward as well as sideways, so that it could be moved in and out of its locking fixture.

If, however, for any reason side-springiness of the lever is to be avoided, then in accordance with the invention the trailer hitch can be fabricated in such a way that a safety-pin (bolt) is put through the spring lever so that the locking pin (bolt) drops downward, secure, into a hook-like fixture. With this arrangement, by pressing the spring lever downward out of its locking position, the trailer hitch may be unhitched.

It is advantageous to make the spring lever longer, past the hook-like fixture, into a handle to provide for easier operation.

For this purpose the lock-fixture of the spring lever in locked position at hitch, in use, ought to be mounted so that the lever is under constant tension in its hook-like fixture. By this means relative play of hitch, between ball-head and ball-head surrounding ball-shell is taken care of, so that any slack at bumps and impacts are avoided. This is achieved through the spring-action of lever, whereby the movable ball-head surrounding-shell-part working are under pressure elastically against the ball-head of the hitch, by which means all hard knocks are avoided, especially when breaking.

In the drawing there is shown a prototype example of the invented trailer hitch with the following figures.

Figure 1:
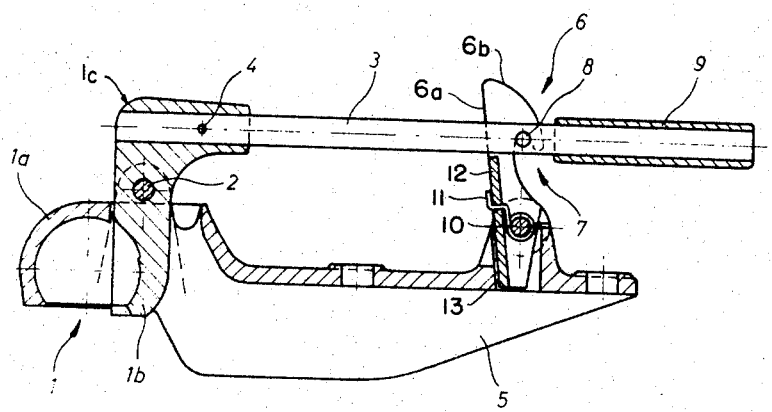
FIGURE 1 is a longitudinal section along line 1—1 in FIGURE 2.
Figure 2:
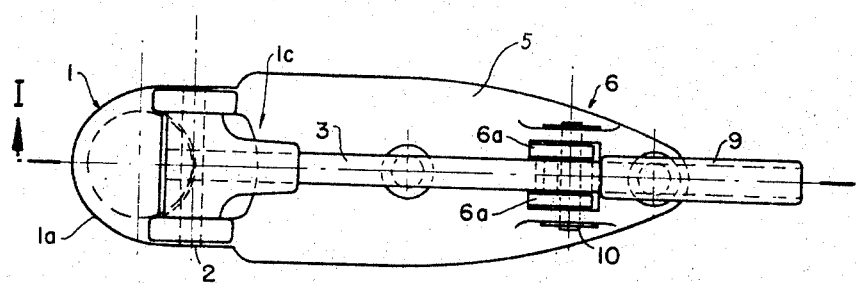
FIGURE 2 is a top view of invented trailer hitch.

A ball, not shown, is mounted on the draft vehicle. The hitch, shown in FIGURES 1 and 2 and secured to the trailer, is adapted to be releasably coupled to the ball to hitch the trailer to the draft vehicle.

The trailer hitch includes a ball-shell 1, which has a spherical cavity to surround and grip the ball of the draft vehicle. The ball-shell 1 has a part 1a formed as a rigid integral portion of the carrier 5. The carrier 5 is rigidly secured to the trailer. The ball-shell 1 also includes a movable part 1b. The part 1b is a portion of an angle piece 1c. The angle piece 1c is hinged on a pivot pin 2 which extends at right angles to the longitudinal center line of the trailer. The pin 2 is mounted on the carrier 5.

The angle piece 1c has at the opposite end from the ball-shell part 1b a spring steel lever 3 secured thereto by fixing means indicated at 4. The lever 3 is resilient and extends rearwardly along the longitudinal center line of the trailer.

The ball-shell 1 is at the front end of the carrier 5, and a lock fixture 6 is at the rear end of the carrier 5. The lock fixture 6 is in the form of a U-shaped double hook. In other words, the lock fixture includes two identical hook portions 6a of the shape shown in FIGURE 2 spaced laterally on opposite sides of the lever 3. The double hook lock fixture is hinged to the carrier 5 at the rear end thereof on a pivot 10 which extends at right angles to the longitudinal center line of the trailer. A spring 11 engages plate 12 connecting hooks 6a and urges the double hook clockwise as viewed in FIGURE 1. The lever 3 has a pair of locking bolts 8 extending laterally outwardly at right angles to the longitudinal center line of the trailer. These locking bolts are adapted to engage in the aligned downwardly opening notches of the hook in locking position.

The hitch is shown in its position of use in which the lever 3 is locked by the locking fixture 6 to cause the ball, not shown, on the draft vehicle to be engaged and firmly gripped between the parts 1a and 1b of the ball-shell 1. The lever 3 is flexed downward from its free state condition and held in tension by the double hook structure 6 to hold the ball firmly gripped in the ball-shell 1 to prevent rattling. To release the hitch, the handle 9 is pushed downward to release the locking bolts 8 from the double hook structure, the latter being then rotated counterclockwise and the lever swung upward clear of the double hook structure to release the ball from the ball-shell 1.

To re-lock the hitch, the handle 9 is pressed downward to cause the bolts 8 to engage the curved surfaces 6b of the double hook structure to cam the latter counterclockwise and permit the bolts 8 to snap into the notches of the double hook structure.

A shoulder 13 on the carrier limits the clockwise rotation of the double hook structure.

What I claim as my invention is:

1. A trailer hitch for coupling a trailer to a ball member carried by a towing vehicle, said hitch comprising a base adapted to be fixedly mounted on the trailer, a first ball-shell part rigidly connected to said base, a second ball-shell part pivotally connected to said base for swinging movement about a horizontal axis toward and away from said first ball-shell part between ball-gripping and ball-releasing positions respectively, the adjacent surfaces of said ball-shell parts being spherically concave and in said ball-gripping position of said second ball-shell part defining a substantially spherical cavity to receive and grip the ball member, an elongated lever having one end fixedly secured to said second ball-shell part and projecting therefrom at right angles to the horizontal axis of pivotal movement of said second ball-shell part, a latch structure carried by said base and having a locking portion releasably engageable with said lever at a point spaced a substantial distance from said one end thereof to lock said lever down, said latch structure comprising a pair of substantially identical latch members disposed side-by-side in generally upright, laterally spaced parallel relation on opposite sides of the plane of swinging movement of said lever, means connecting said latch members to said base for limited pivotal movement about a horizontal axis, said locking portion of said latch structure comprising hooked portions of said latch members defining aligned downwardly opening recesses of inverted generally U-shape, said lever having aligned pins extending horizontally outwardly therefrom in opposite directions, said pins being receivable in said recesses when said lever is flexed downward between said latch members to lock said lever down, said recesses being deep enough to fully receive said pins, said lever being flexibly resilient and when disengaged from said recesses is disposed above said locking portion, said lever being flexible further downward to withdraw said pins from said recesses and release said lever.

References Cited

UNITED STATES PATENTS

| 1,351,098 | 8/1920 | Corwin | 280—512 |
| 1,591,659 | 7/1926 | Corwin | 280—512 |
| 2,580,770 | 1/1952 | Harris | 280—512 |

FOREIGN PATENTS

| 790,757 | 11/1935 | France. |
| 837,654 | 3/1952 | Germany. |

BENJAMIN HERSH, *Primary Examiner.*

J. SIEGEL, *Assistant Examiner.*